United States Patent
Wade et al.

(10) Patent No.: US 7,971,995 B2
(45) Date of Patent: Jul. 5, 2011

(54) NET-MOLDED OPTICAL ARTICLES AND METHODS OF MAKING THE SAME

(75) Inventors: Gardner Wade, San Clemente, CA (US); Alan McHugh, Riverside, CA (US); Larry Butler, Ladera Ranch, CA (US)

(73) Assignee: Oakley, Inc., Foothill Ranch, CA (US)

( * ) Notice: Subject to any disclaimer, the term of this patent is extended or adjusted under 35 U.S.C. 154(b) by 238 days.

(21) Appl. No.: 12/118,506

(22) Filed: May 9, 2008

(65) Prior Publication Data

US 2009/0279049 A1 Nov. 12, 2009

(51) Int. Cl.
*G02C 7/02* (2006.01)

(52) U.S. Cl. .................................................. 351/159

(58) Field of Classification Search .................. 351/159, 351/174, 177
See application file for complete search history.

(56) References Cited

U.S. PATENT DOCUMENTS

| | | | |
|---|---|---|---|
| 3,750,272 A * | 8/1973 | Gomond | 29/558 |
| 3,899,315 A * | 8/1975 | Siegmund | 65/23 |
| 4,364,878 A * | 12/1982 | Laliberte et al. | 264/2.2 |
| 4,573,903 A | 3/1986 | Boudet et al. | |
| 5,110,514 A * | 5/1992 | Soane | 264/496 |
| 5,114,632 A * | 5/1992 | Soane | 264/496 |
| 5,324,473 A | 6/1994 | Baresich | |
| 6,068,906 A * | 5/2000 | Sasa et al. | 428/64.2 |
| 6,075,066 A * | 6/2000 | Matsuda et al. | 523/106 |
| 6,276,656 B1 | 8/2001 | Baresich | |
| 2002/0014722 A1 | 2/2002 | Baresich | |
| 2003/0043731 A1* | 3/2003 | Kerfeld et al. | 369/280 |
| 2003/0113398 A1 | 6/2003 | Chiu et al. | |
| 2006/0170125 A1 | 8/2006 | Baresich et al. | |

FOREIGN PATENT DOCUMENTS

JP 2001 113580 4/2001

OTHER PUBLICATIONS

International Search Report and Written Opinion received on Aug. 31, 2009 in corresponding application No. PCT/US2009/043078.
International Preliminary Report on Patentability dated Nov. 9, 2010 and issued in corresponding application No. PCT/US2009/043078.

* cited by examiner

*Primary Examiner* — Jordan M. Schwartz
(74) *Attorney, Agent, or Firm* — Knobbe, Martens, Olson & Bear, LLP

(57) ABSTRACT

An injection molding apparatus and method of use are provided whereby a net-molded optical article can be produced. Edge wave deviations are reduced by controlling the cooling profile of the resin. The apparatus can be configured to include at least one heat control element disposed adjacent to an edge of the mold cavity. After plasticized resin has been injected into the mold cavity, the edge of the mold cavity can be thermally regulated relative to the center of the cavity.

4 Claims, 10 Drawing Sheets

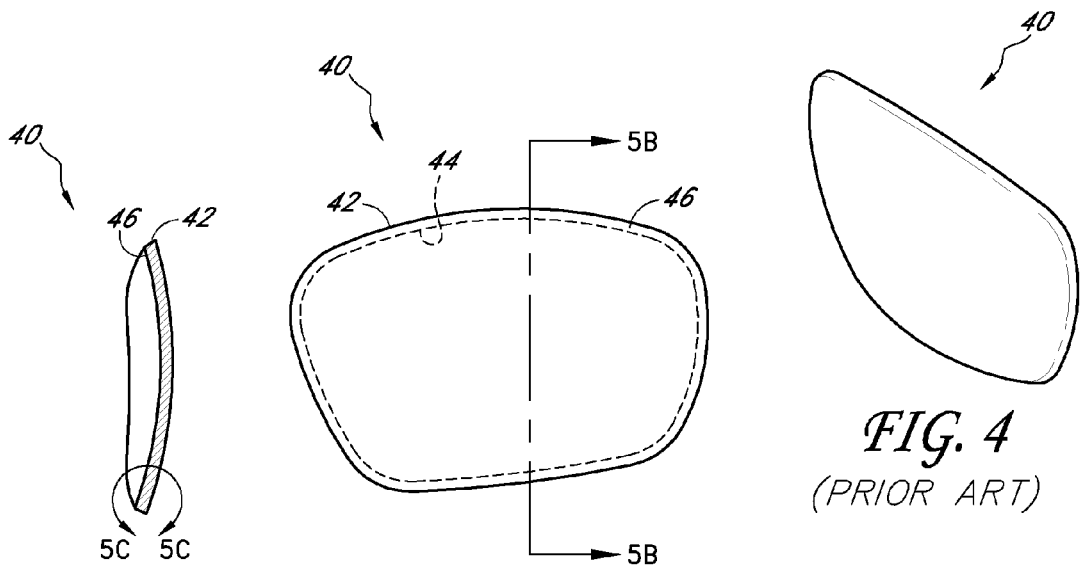
FIG. 5B (PRIOR ART)   FIG. 5A (PRIOR ART)   FIG. 4 (PRIOR ART)
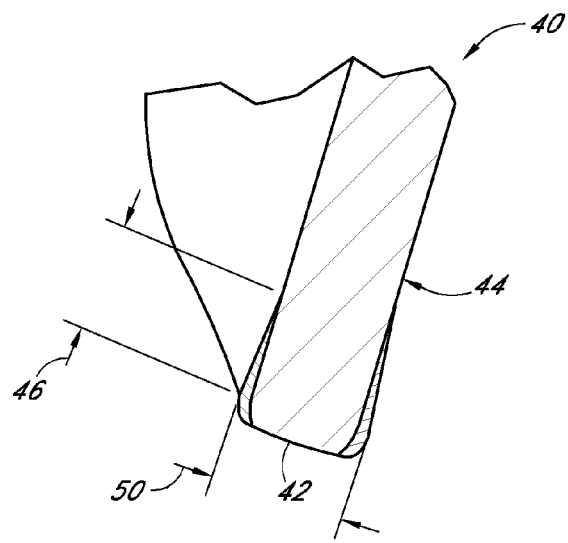
FIG. 5C (PRIOR ART)

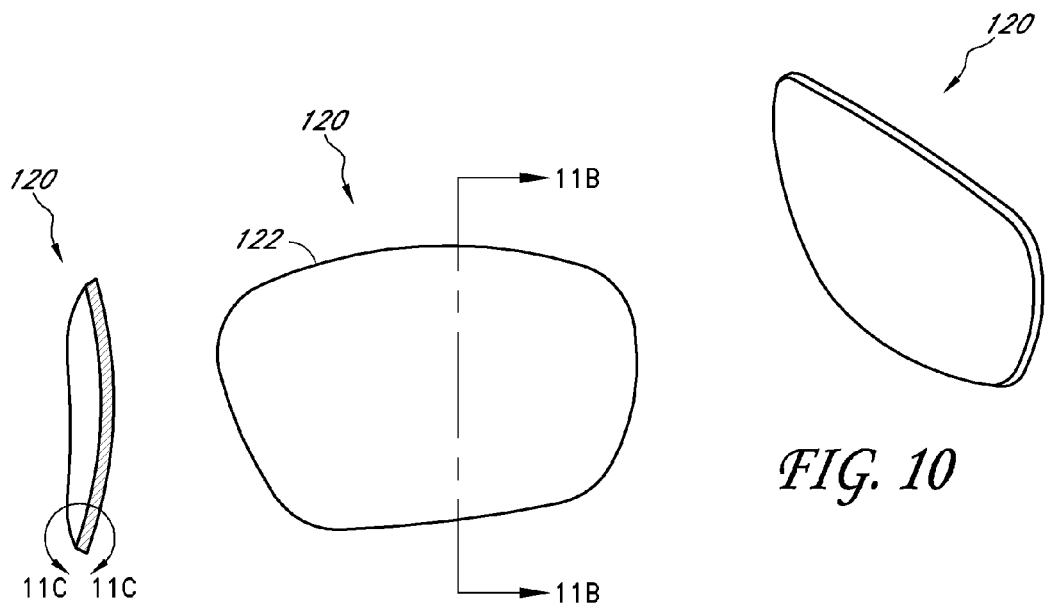
FIG. 10
FIG. 11B    FIG. 11A
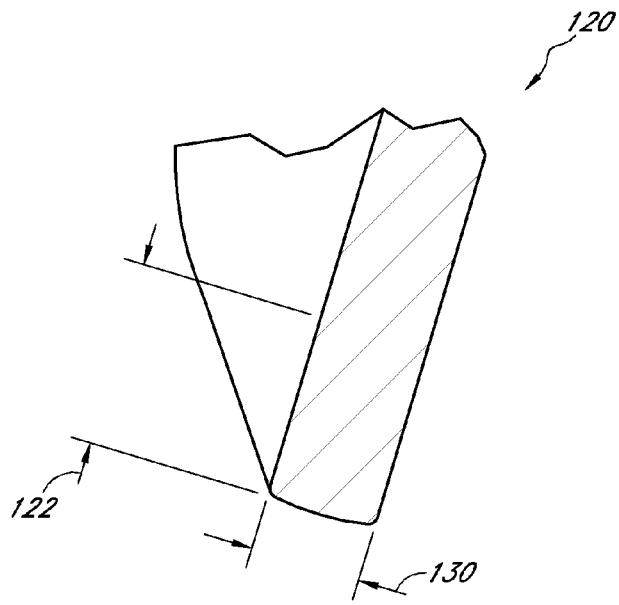
FIG. 11C

NET-MOLDED OPTICAL ARTICLES AND METHODS OF MAKING THE SAME

BACKGROUND

1. Field of the Inventions

The present inventions relate generally to injection molded articles used in optical applications. Such articles can include optical lenses and optical discs. More specifically, the present inventions relate to methods and apparatuses for producing net-molded optical articles that are formed so as to reduce and/or eliminate optical distortion along the peripheral edges thereof through differential cooling of the injection molded article.

2. Description of the Related Art

Injection molded articles that are used in optical applications must be formed as bubble-free bodies having accurately contoured, optically smooth outer surfaces. Generally, such articles are made from a synthetic resin and are molded to a desired final shape. As such, articles such as optical discs for data storage and eyewear lenses, including ophthalmic lenses, can be made quickly, inexpensively, and provide various desirable physical characteristics.

The injection molding process has the following basic steps: plasticizing, injection, chilling, and ejection. These steps are distinct from each other and must each be properly performed in order to ensure that an accurately-dimensioned and optically-acceptable article is produced using the injection molding process.

During the plasticizing step, a material, such as a polymer, is heated until the material is melted. The plasticizing step converts the material from its normal hard, often granular, form at room temperature to a liquid having a consistency necessary for use in the injection molding process at its correct melt temperature. The plasticized material is then injected into a mold until it completely fills the mold cavity.

After the mold cavity is completely filled, the material is allowed to cool. In this step, often called chilling, heat is removed from the plasticized material to convert it from a liquid consistency back to its original solid, rigid state. As the material cools, it also shrinks.

Finally, after the material is solidified, the molded part can then be ejected from the mold cavity. Thus, the mold cavity is opened, and the cooled, molded part is released or ejected from the mold cavity.

When creating an injection molded eyeglass lens, manufacturers often use a mold having a mold cavity that is configured to produce a molded part that has a much larger size than required to produce a lens of a desired size. This molded part, often called a lens blank, generally defines a perimeter that is much larger than the perimeter of the final, cut lens. Once the lens blank is prepared, the lens is cut therefrom. This method is useful because an injection molded lens blank can be shaped to define a variety of desirable geometries, and the lens can be cut from the blank in a manner to inherit the desirable geometry from the blank. For example, the lens blank can be formed as a planar lens blank or it can define a simple or complex arcuate contour, such as that of a portion of the surface of a cylinder or sphere. These principles are illustrated in U.S. Pat. No. 6,168,271, issued Jan. 2, 2001 and titled, Decentered Noncorrective Lens For Eyewear.

After a lens blank is prepared, it is cut to define a lens of a desired, final shape. This step in the preparation of a final lens can involve considering the orientation of the optical axis relative to the final lens, the shape and orientation of the orbital in which the lens will be received, and finally, precisely cutting the lens blank in order to produce a final lens having the desired optical qualities and shape. Thereafter, the excess material of the lens blank is typically discarded. Edge defects on the blank, arising from the molding process, are thus not transferred to the finished lens.

Once the final lens is cut from the blank, the edges of the final lens may be smoothed or polished in preparation for mounting on an eyewear frame. For example, when used with eyewear frames that surround only a portion of the lens, the exposed perimeter of the lens should be smooth in order to be aesthetically and physically acceptable. However, when used with eyewear frames that surround the entire periphery of the lens, the edges of the lens may not need to be polished or smooth. Thus, depending on the application and the eyewear frame with which a final lens will be paired, additional finishing operations may be required after the final lens is cut from the lens blank.

SUMMARY

According to at least one of the embodiments disclosed herein is the realization that the use of a lens blank to create a final lens product results in the waste of valuable lens material, often requires finishing operations to produce a useful final product, and is a time-consuming and inefficient process. Therefore, in accordance with at least one of the embodiments disclosed herein is the realization that there is a need in the art to provide an improved injection molding process and apparatus whereby a molded article can be molded to a net or final shape thereby eliminating cutting or finishing steps. More specifically, there is a need in the art for an improved injection molding process and apparatus that produces a net-molded article whose peripheral edge does not exhibit a thickening, or edge wave which is seen in lenses and blanks from conventional molding processes.

Constant thickness or uniform surface curvature throughout molded articles formed by conventional injection molding processes does not appear to be easily attainable. This challenge results for at least the reason that during cooling, uneven crystallization of the molten resin often causes localized volumetric changes, molecular migration, and shrinkage or thinning of the article. Under typical molding conditions, there are usually significant variations in crystallinity throughout a molded article. It is at least for this reason that the lens blanks have been required in order to produce the final lenses that do not exhibit optical distortion along with their periphery or perimeter. Further, it is at least for this reason that optical discs used in data storage have hitherto been unable to store additional data along their periphery.

The variations in crystallinity throughout a molded article occur as an amorphous plasticized material cools. When cooling, peripheral portions of the material tend to cool at a faster rate than more central portions, which generally remain above the melt temperature longer than the peripheral portions. During cooling, the resin is undergoing crystallization. Generally, because a crystallized material will occupy a smaller volume than an amorphous material, the normal differential cooling rates at different locations in the molded article often produces volumetric variations in the article.

In the case of a molded lens or optical disc, the peripheral edge solidifies before the central zone of the article. As the resin cools at the edge of the mold cavity, adjacent molten polymers are drawn to join the crystalline structure. This results in a solidified lens edge which fills the full thickness of the mold cavity. But as the center of the lens cools, there is no additional molten resin to compensate for the shrinkage. As a result, the center portion of the lens shrinks to a lesser thickness than the edge portions. The result is a thickened bead or wave surrounding the peripheral edge of the lens or optical disc.

In accordance with embodiments disclosed herein is the realization that if one can create a mold apparatus and method that avoids the thickened edge, high precision optical molded articles can be manufactured in a "net-molded" or final shape.

Therefore, according to an embodiment of the present inventions, there is provided an injection molding apparatus for forming a net-molded optical part with reduced optical distortion along a perimeter thereof. The apparatus can comprise a mold die for defining a mold cavity, and at least one thermal regulating element disposed in thermal communication with the mold cavity. The mold cavity can include a peripheral edge and an interior, central portion.

The thermal regulating element(s) can be configured to delay hardening of the peripheral edge of the article relative to the hardening in the central portion of the article. In one implementation of the present inventions, this involves supplying heat to the peripheral edge so that it does not solidify until substantially the same time as or following solidification in the central portion. Alternatively, the central portion can be cooled, to keep pace with or exceed the rate of cooling along the peripheral edge. Embodiments of the present inventions will be described primarily in terms of the implementation involving supplying heat to the peripheral edge, but broader inventions are understood to be regulating the rate of cooling across the injected molten resin to allow the central portion to drop below a hardening temperature such as the glass transition temperature for the resin before the peripheral portion does.

The heating element can extend adjacent to the perimeter of the mold cavity. In some embodiments, the heating element can be disposed in a first channel extending adjacent to the perimeter of the mold cavity. The heating element can be positioned at a first distance from the perimeter of the mold cavity. The heating element can be configured to control temperature of the mold die around and/or adjacent to the perimeter of the mold cavity for slowing the cooling rate of the optical part in the peripheral zone to more closely conform to the cooling rate in the cavity interior.

In some embodiments, the first channel can be formed within the alignment plate portion of the mold die. The optical insert portion can be formed from a continuous piece of material that does not include a thermal channel. The first channel can extend continuously or discontinuously surround the perimeter of the mold cavity. In some embodiments, the first channel can extend continuously around at least a portion of the perimeter of the mold cavity. For example, the first channel can extend continuously around at least 50% of the perimeter of the mold cavity. Additionally, the first channel can extend continuously around at least 75% of the perimeter of the mold cavity. Finally, the first channel can extend continuously around the entire perimeter of the mold cavity.

The mold die can comprise a thermally conductive material having a first thermal conductivity and the mold die can further comprise an insulation gap formed therein adjacent to the heating element such that the heating element is disposed intermediate the mold cavity and the insulation gap. The insulation gap can define a second thermal conductivity. The second thermal conductivity can be less than the first thermal conductivity of the mold die for reducing heat loss from the heating element in a direction leading away from the cavity.

The injection molding apparatus can further comprise a cooling element that is disposed in a second channel being spaced distal to the first channel in a direction generally opposite the cavity interior direction. The cooling element can be positioned at a second distance from the perimeter of the mold cavity. The second distance can be greater than the first distance. The cooling element can be configured to remove heat from the mold die.

In some embodiments, the mold cavity can define a geometry for a net-molded piano or prescription optical lens. In other embodiments, the mold cavity can define a geometry for a net-molded optical disc such as a compact disk (CD) or DVD.

In accordance with another embodiment, an injection molding apparatus is provided for reducing optical distortion along a periphery of an injection molded optical part. The injection molding apparatus in such an embodiment can comprise a mold cavity, a cooling element, and a heating element. The mold cavity can be formed by a plurality of mold parts and can define a cavity perimeter and a cavity center. The mold cavity can further define upper and lower mold surfaces. The upper and lower mold surfaces can converge to define an edge along the cavity perimeter of the mold cavity. The mold cavity can define a given part geometry.

The cooling element can be formed in at least one of the mold parts for facilitating the transmission of a cooling fluid through the injection molding apparatus. The cooling element can be disposed around, adjacent to, and/or surrounding the mold cavity and being spaced from the mold cavity for facilitating thermal conductivity through the mold cavity. The heating element can be disposed adjacent to the edge of the mold cavity intermediate the edge of the mold cavity and the cooling element. In this regard, the cooling element and the heating element can interact to create thermal conduction through the injection molding apparatus to thereby provide thermal regulation of the mold cavity such that the edge of the mold cavity and the mold cavity center cool at comparable rates and/or reach the resin glass transition temperature at approximately the same time.

In some implementations, the cooling media can be a gas such as air, or a circulating liquid. The heating element can be circulating liquid, electrical resistance element or other source to provide heat to the mold cavity. The part geometry can be that of one of a net-molded optical disc and a net-molded optical lens.

In accordance with another embodiment, a method of forming an injection molded optical part is provided. The method can comprise the steps of: injecting a charge of plasticized resin into a mold cavity having an internal geometry configured to form the resin into the optical part; regulating the rate of cooling of the mold cavity to prevent early solidification around the periphery of the mold cavity relative to the central portion of the mold cavity; and ejecting the optical part from the mold cavity.

The method can further comprise the step of setting a first temperature of the mold cavity along a periphery thereof to be approximately above a hardening temperature such as the glass transition temperature of the resin. The method can also further comprise the step of setting a second temperature of the mold cavity along a central portion thereof to be less than the glass transition temperature of the resin.

In some embodiments, the step of setting the first temperature can comprise heating the periphery of the mold cavity. Further, the method can comprise lowering an amount of heat provided to the perimeter of the mold cavity as a temperature of the resin at the central portion of the mold cavity cools. Additionally, the step of setting the first temperature can comprise heating the periphery of the mold cavity with a heating element positioned adjacent to periphery of the mold cavity.

The step of setting the second temperature can comprise cooling the central portion of the mold cavity. Further, the step of setting the second temperature can comprise cooling the mold cavity with a cooling element configured such that a heating element is positioned intermediate cooling element and the periphery of the mold cavity.

Additionally, the method can comprise the step of allowing a peripheral edge of the optical part to cool to the glass transition temperature after a central section of the lens has reached the glass transition temperature. Accordingly, the method can be utilized to form an injection molded optical lens or an injected molded optical disc.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures:

FIG. 4 is a perspective view of an eyeglass lens made in accordance with a prior art injection molding process.

FIG. 5A is a plan view of the eyeglass lens of FIG. 4.

FIG. 5B is a cross-sectional view of the eyeglass lens of FIG. 5A taken along lines 5B-5B.

FIG. 5C is an enlarged view of a lower edge the eyeglass lens of FIG. 5B taken along section line 5C.

FIG. 10 is a perspective view of an eyeglass lens made in accordance with an embodiment of the present inventions.

FIG. 11A is a plan view of the eyeglass lens of FIG. 10.

FIG. 11B is a cross-sectional view of the eyeglass lens of FIG. 11A taken along lines 11B-11B.

FIG. 11C is an enlarged view of a lower edge the eyeglass lens of FIG. 11B taken along section line 11C.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein.

Figure 1:
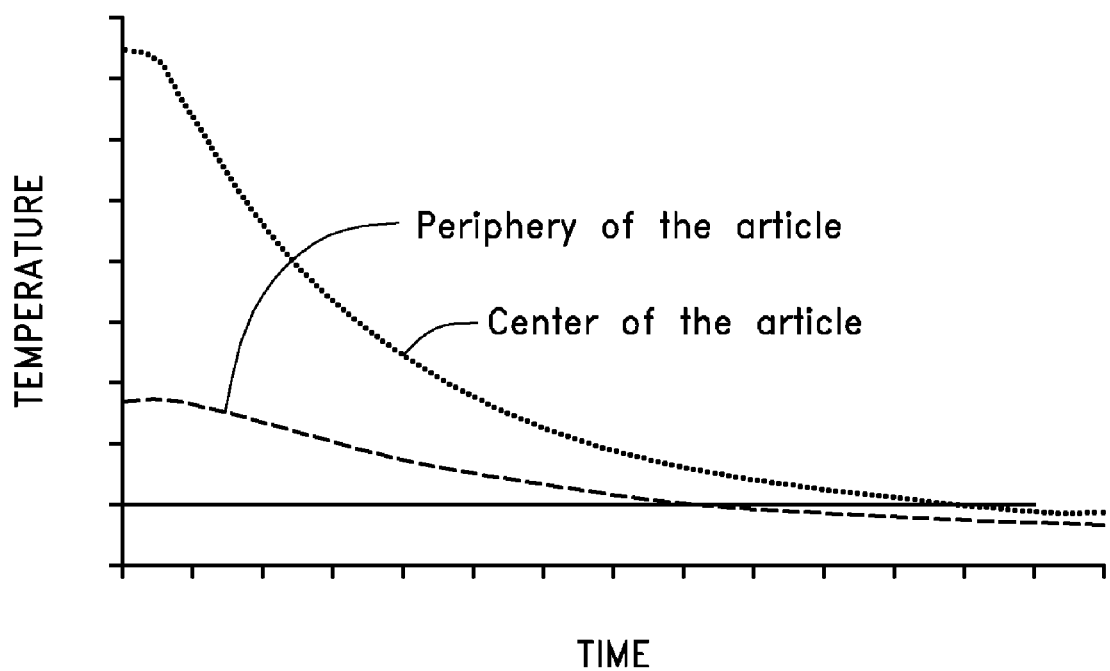
FIG. 1 is a graph illustrating temperature histories of a polycarbonate optical disc made using a prior art injection mold apparatus.

As discussed briefly above, various prior art molding techniques have been employed to optimize part quality and mold efficiency, among other things. FIG. 1 is an illustration of a graph of temperature histories of a polycarbonate disk made using a prior art injection mold apparatus, with reference to a glass transition temperature. As illustrated in FIG. 1, the temperature of the molded article is generally the highest just after the resin has been injected into the mold cavity, and in particular, the temperature is higher roughly in the center of the molded article than at the surface of the article (or at the mold-resin interface) where conduction to the mold has already started to occur.

As shown in FIG. 1, shortly after injecting a charge of resin into a mold cavity of an optical disc, the temperature of the resin in the mold cavity begins to drop toward the glass transition temperature. As illustrated, the molded part solidifies at its periphery several seconds before the part solidifies at its center. As discussed above, during the solidification process, the resin changes phases into a solid, crystalline structure. Due to the fact that many types of resin used in injection molding processes typically decrease in volume as they cool and crystallize, the solidified part generally has a smaller volume than the charge of resin that was used to create the part.

For example, when cooling occurs at the periphery, such as outer bounds, surface, extremities, or edges of a part, these sections of a solidified part have a resultant dimension or thickness that is generally equal to the interior geometry of the mold cavity at the given section of the mold cavity. In effect, as these sections cool, the developing crystalline structures of the solidified part draw in additional molecules of the resin from the still liquefied or plasticized adjacent volume of the resin. Therefore, because the volume of the resin decreases as the resin cools and crystallizes, a lesser amount of resin is available to fill the remainder of the internal volume of the mold cavity.

Accordingly, although the dimensions of portions of the part remain approximately equal to the dimensions of the part cavity during the initial phases of the cooling process, the remainder of the part tends to exhibit dimensions that are less than the corresponding dimensions of the mold cavity. As a result, at least one of the first or last sections of the part to cool may not have the desired dimensions. Generally, the peripheral portions of a part such as an eyeglass lens are the first portions of the part to cool. The perimeter edges of an optical disc or an eyeglass lens are in contact with not only top and bottom surfaces of the mold cavity, but are also in contact with a side surface of the mold cavity. As a result, more heat can be transferred from the cooling resin in the perimeter of the cavity to the mold. According to at least one of the embodiments disclosed herein is the realization that dimensionally inaccuracies resulting from prior art injection molding techniques can be remedied through the use of temperature regulation during cooling of the mold cavity.

Furthermore, in accordance with at least one of the embodiments disclosed herein is the realization that the dimensional inaccuracies that result from nonuniform cooling of a part can be undesirable due to the loss of valuable optical space. For example, an optical disc such as a CD or DVD has a given storage capacity that is at least partially dependent on the useful surface area of the optical disc. However, data on an optical disc cannot be read from portions such as the peripheral zone of the optical disc which have dimensional inaccuracies resulting in optical distortion.

In the current state of the art, there is at least a small portion of a CD or DVD, approximately 1-2 mm, along the surface adjacent the periphery of the CD or DVD that is not used for storing data. If an optical disc can be injection molded so as to eliminate dimensional inaccuracies along the perimeter of the optical disc, the use of the 1-2 mm of currently unused disc space could represent a meaningful increase in the storage capacity of the optical disc. This may be significant because the 1-2 mm of unused disc space is along the perimeter of the disc where the circumference, and hence the surface area, is the greatest. Such an increase in the useful surface area can represent a gain of up to approximately 8-9% in the available storage surface area of an optical disc.

Furthermore, as also discussed above, the elimination of optical distortion along the periphery of an injection molded optical lens can reduce the amount of waste material and time lost in cutting an optical lens from a lens blank or other post molding operations to avoid the optical distortion along the periphery of the blank.

Figure 2A:
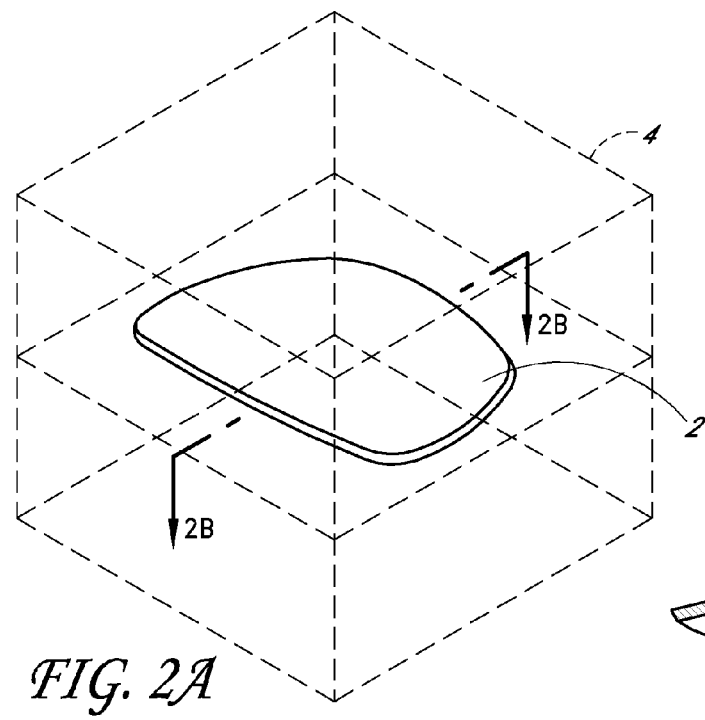
FIG. 2A is a perspective view of a lens made in accordance with a prior art method and apparatus.
Figure 2B:
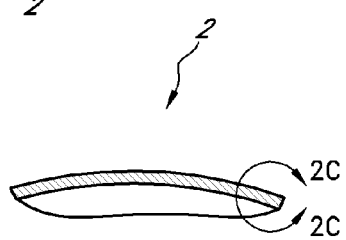
FIG. 2B is a side cross-sectional view of the lens of FIG. 2A taken along the lines 2B-2B of FIG. 2A.
Figure 2C:
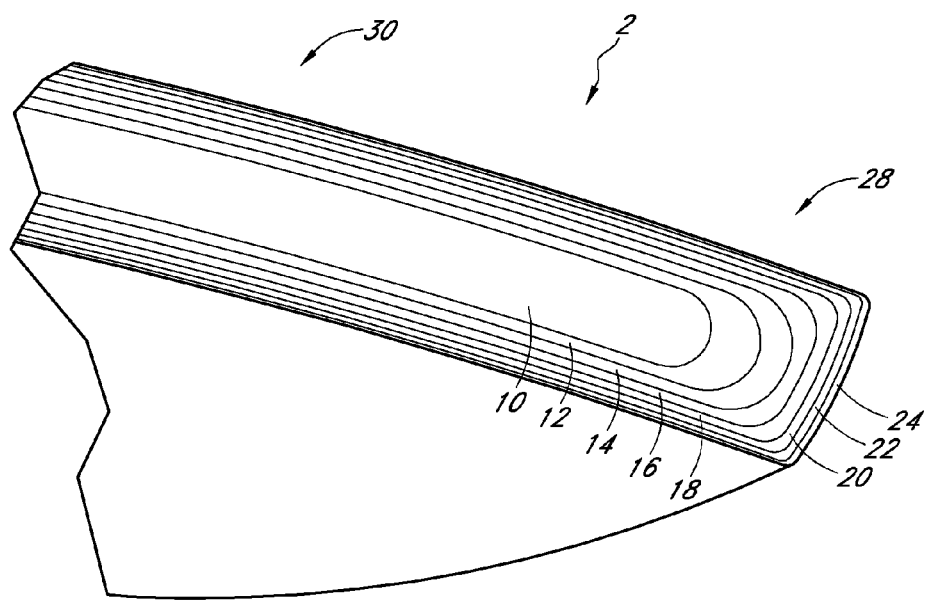
FIG. 2C illustrates a heat map of a portion of the lens of FIG. 2A taken along lines 2C-2C of FIG. 2B, representing general isothermal zones in the lens as the lens solidifies in a mold cavity immediately after resin has been injected into the mold cavity, in accordance with the prior art injection molding method and apparatus.

Referring now to FIGS. 2A-C, FIG. 2A is a perspective view of a lens 2 being formed within a prior art injection molding apparatus 4. FIGS. 2A-C represent the lens 2 as it begins to cool immediately after resin has been injected into a mold cavity of the apparatus 4. FIG. 2B is a side cross-sectional view of the lens 2 of FIG. 2A taken along the lines 2B-2B. Upon cooling (see FIGS. 4-5C), the lens 2 will exhibit the deficiencies noted herein with respect to optical distortion along the perimeter of the lens 2 because the lens 2 has been manufactured according to a prior art injection molding method and apparatus.

FIG. 2C is a heat map of a portion of the lens 2 taken along the lines 2C-2C of FIG. 2B. FIG. 2C represents generally isothermal zones within the lens 2 as the lens 2 begins to solidify in a mold cavity immediately after resin has been injected into the mold cavity to form the lens 2, in accordance with the prior art injection molding method and apparatus. In this regard, that the heat map generally illustrates constant temperature zones within the lens 2 during cooling of the lens 2. The generally constant temperature or generally isothermal zones are represented by element numbers 10-24. It is appreciated that the temperature in the zones is not equal or constant, and therefore, is not precisely isothermal; however, for simplicity, these zones are illustrated to show a general shift in temperature throughout the lens 2. The interior portion of the lens 2 will be at a higher temperature than the outer portions of the lens 2. Accordingly, in the map, isothermal zone 10 generally represents the highest temperature and isothermal zone 24 generally represents the lowest temperature.

For example, the isothermal zone 10 of the lens 2 represents an interior portion of the lens 2. Similarly, the isothermal zone 24 represents an exterior portion of the lens 2. Each of the isothermal zones 10, 12, 14, and 16, generally represent the temperature distribution of an interior portion of a molded part. Isothermal zones 18, 20, 22, and 24 generally represent the temperature distribution of sections along an exterior of an injection molded part. The heat map of the FIG. 2C illustrates that during cooling the temperature of the lens 2 along its edges 28 tends to drop more rapidly than the temperature of radially interior sections 30 of the lens 2. As such, this phenomenon results in greater lens thicknesses along the edges 28 than in the radially interior sections 30.

The temperature distribution of the lens 2 is typical of injection molding lens techniques that are known in the art. As discussed above, various dimensional inaccuracies would result in the lens 2 due to the way in which the lens 2 cools within the mold cavity. The edges 28 of the lens 2 would cool more quickly than the center of the lens 2 and therefore produce relative dimensional inaccuracies, especially along the perimeter of the lens 2. As discussed above, the perimeter of the lens would therefore lose its optical purity due to the distortion that results from the dimensional inaccuracies. Further, in terms of optical discs, a meaningful portion of potential disc storage space can be lost.

Figure 3:
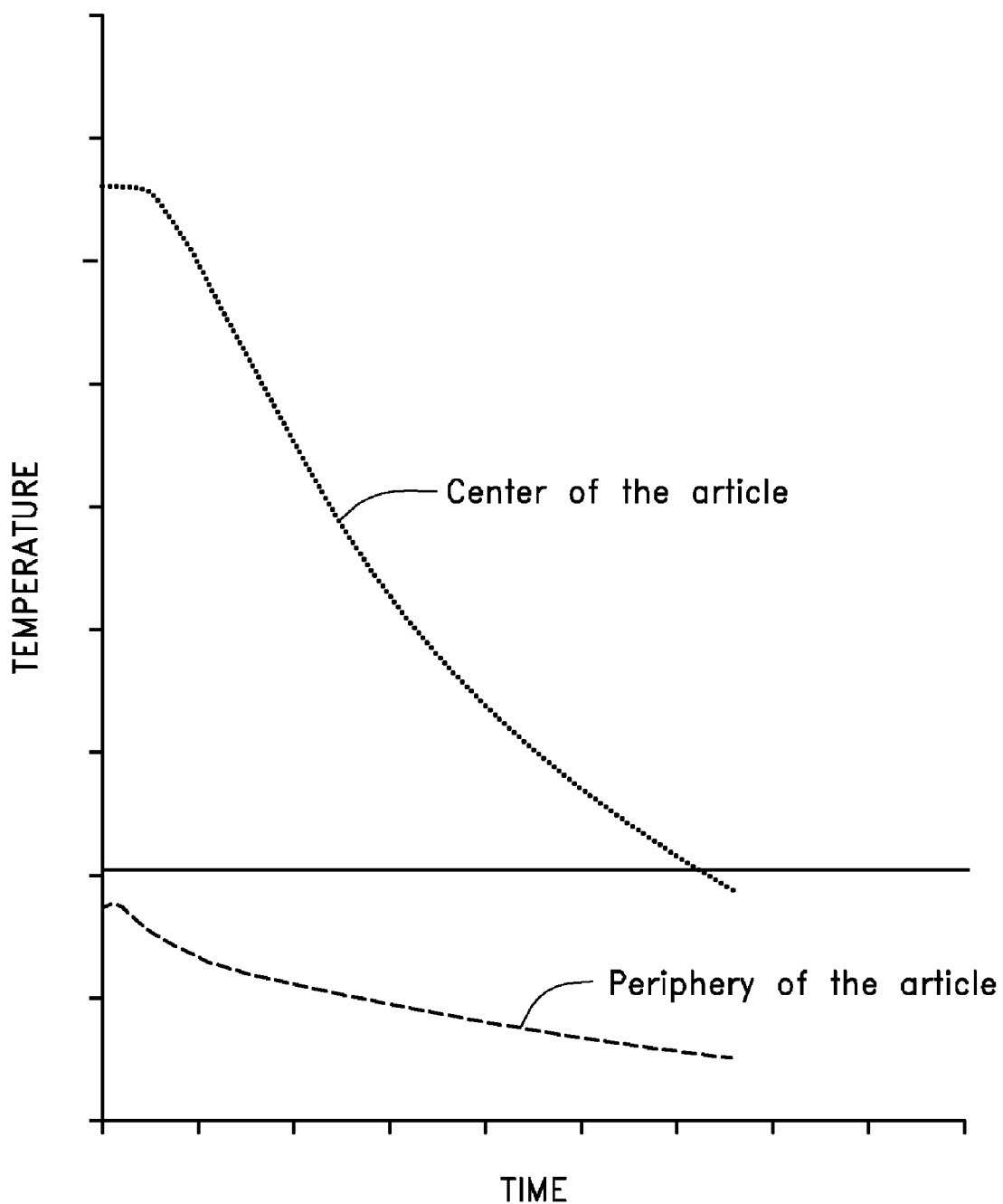
FIG. 3 is a graph illustrating temperature histories of a disc made using another prior art injection mold apparatus.

FIG. 3 is a graph illustrating temperature histories of an optical disc formed using a prior art injection mold apparatus. In this example, the temperature of the mold cavity surface is maintained below the glass transition or solidification temperature of the resin. This method and apparatus are typical of prior art injection molding apparatuses and result in the significant dimensional inaccuracies described above. Further, various prior art injection molding methods maintain the cavity surface at a temperature lower than the glass transition temperature of the resin. As such, the surfaces, edges, and other extremities of the optical disc tend to solidify well before the center portions of the optical disc and the above-mentioned dimensional inaccuracies result.

With reference now to FIGS. 4-5C, the dimensional inaccuracies described above are illustrated in the context of a molded to shape eyeglass lens 40. In this example, the lens 40 represents a lens in an as-molded configuration. Therefore, the lens 40 has not been cut or otherwise finished using any post-molding operation. The lens 40 includes a perimeter 42 and a transition line 44. Although the lens 40 is illustrated as the lens used in a dual lens eyewear system, the lens 40 may also represent a unitary lens. The transition line 44 is spaced inwardly apart from the perimeter 42 of the lens 40 by the width of a periphery 46, which in this example, is thickened through the molding process to produce optical distortion.

As illustrated in FIG. 5C, the periphery 46 or optical distortion zone represents a section of the lens 40 that cools much more quickly than the center sections of the lens 40, as discussed above. As such, the lens 40 has a greater maximum thickness 50 in the periphery 46. Accordingly, any light passing through the periphery 46 would tend to be prismatically shifted relative to a parallel ray of light passing through other more central optical portions of the lens 40.

In this regard, the periphery 46 of the lens 40 represents non-usable or undesirable material. Typically, an eyeglass manufacturer will cut the lens 40 from a lens blank, which would ensure that the lens 40 does not exhibit optical distortion along its periphery 46 which is discarded with the scrap portion of the blank. Such a finishing operation may be necessary when at least a portion of the periphery 46 of the lens 40 is exposed when the lens 40 is mounted to the eyeglass frame. However, a net-molded or as-molded lens may be used without making any cuts or other modifications to the lens if the periphery is to be covered by a portion of the orbital that retains the lens.

Figure 6:
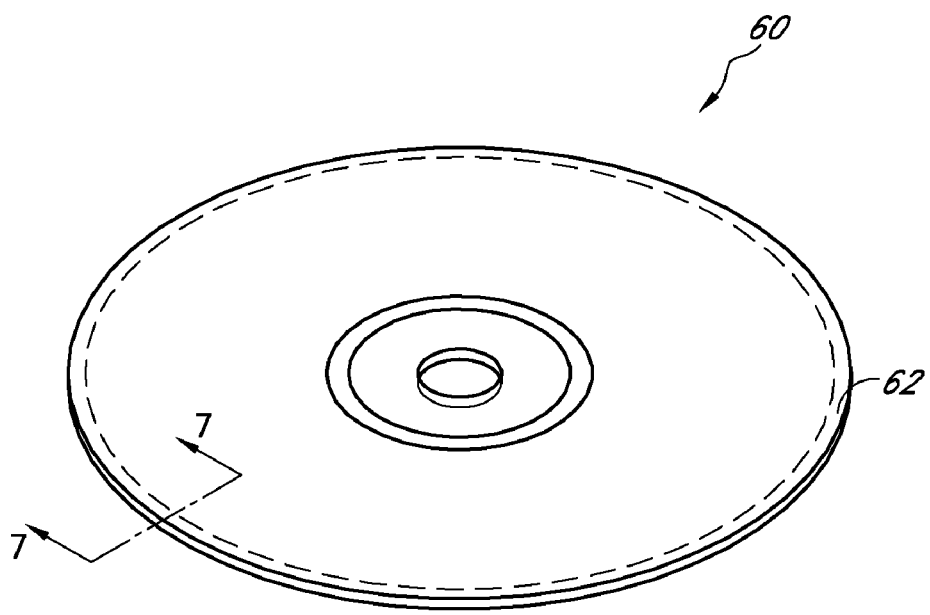
FIG. 6 is a perspective view of a compact disk made in accordance with a prior art injection molding process.
Figure 7:
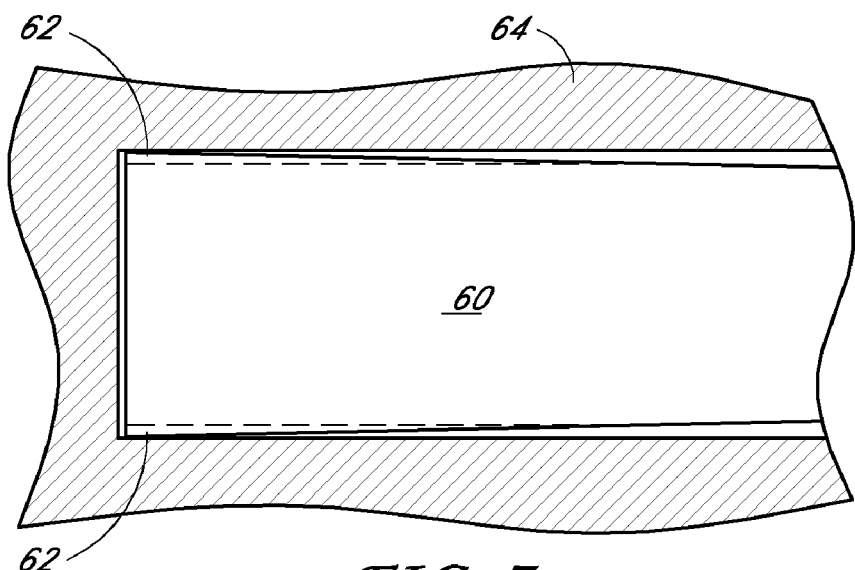
FIG. 7 is a cross-sectional view of a mold cavity and a disk after cooling in the mold cavity wherein the disk has increased thickness along its perimeter, in accordance with a prior art injection molding process.

Nevertheless, in manufacturing optical discs for use as CDs or DVDs, no "blank" is used. Instead, optical disks used for CDs and DVDs are used in their as-molded configuration regardless of the storage capacity lost due to the optical distortion zone. FIGS. 6 and 7 illustrate an optical disc 60 used in CDs and DVDs, as well as an optical distortion zone in a periphery 62 of the disc 60. The optical distortion zone generally lies along the periphery 62 of the optical disc 60. As briefly mentioned above, due to the optical distortion zone, a portion of the optical disc remains unused. Generally, the optical distortion zone represents approximately 8-9% of the available storage surface area of an optical disc.

FIG. 7 is an enlarged, side cross-sectional view of the optical disc 60 in a cavity of mold 64. In accordance with the discussion above, the zone 62 of the disc 60 represents that portion of the disc 60 that cooled faster than the center portions of the disc 60. As discussed above, the perimeter edges of an optical disc or an eyeglass lens may exhibit more resultant dimensional inaccuracies because the part is in contact with not only top and bottom surfaces of the mold cavity, but it is also in contact with a side surface of the mold cavity which accelerates heat loss.

The present inventions provide methods and an apparatus for reducing or eliminating the edge bead described above. This allows production of a substantially planar article, such as a CD or DVD, and that the article can have a substantially planar surface throughout its full diameter, thereby increasing the available area for data. In the case of a net molded eyeglass lens, a pre-determined surface geometry of the lens (e.g. spherical, elliptical, aspheric, etc.) may be maintained throughout the entire surface of the lens.

This can be accomplished by modifying the molding equipment in a manner that permits uniform cooling of the injected resin (e.g., polycarbonate, CR-39) throughout at least a portion, if not the entire molded article. In conventional eyeglass lens molds, this normally involves slowing the rate of cooling in the peripheral regions of the lens relative to the rate of cooling in more central regions of the lens as has been described. Slowing the rate of cooling in the peripheral portion of the mold cavity may be conveniently accomplished by adding heat in thermal communication with the periphery of the cavity. The heat may be in the form of a continuous source, or an intermittent source. In addition, the heat may be maintained at a constant level, or may decline at a rate that corresponds to the rate of cooling of more central portions of the mold cavity, to produce an overall uniform rate of cooling. Alternatively, the cooling differential may be reduced or eliminated by subtracting heat from the center portion of the mold relative to the peripheral portions of the mold.

Figure 8:
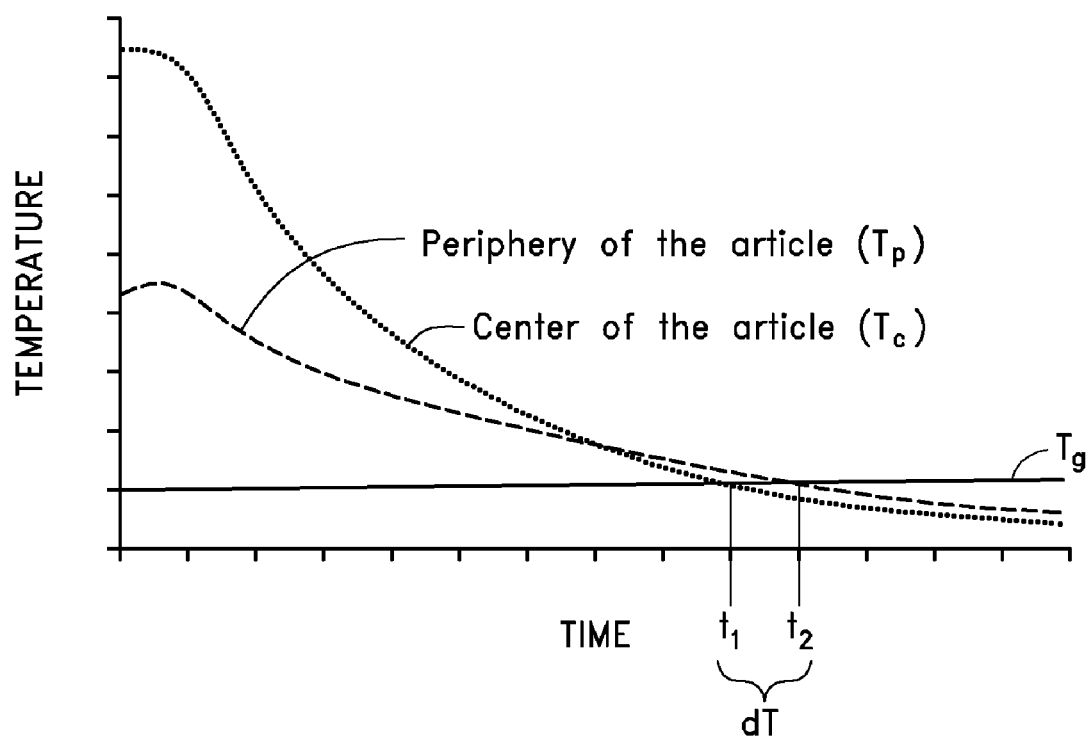
FIG. 8 is a graph illustrating temperature histories of a disc or lens made in accordance with an embodiment of the present inventions.

In accordance with one embodiment of the present inventions, FIG. 8 schematically illustrates the temperature versus time distributions in a part that is injection molded using an embodiment of the present inventions. Referring to FIG. 8, the center temperature (Tc) drops below the reference temperature at time $t_1$ before the peripheral edge temperature Tp drops below the reference temperature at a later time t2. The injection molding apparatus is thus controlled in a manner that prevents the perimeter of an optical disc or optical lens from cooling at a rate that permits solidification and crystallization along the perimeter thereof sufficiently prior to solidification and crystallization of interior or center portions to cause optical aberrations or otherwise degrade functionality of the periphery of the molded part.

The difference in time dt between t1 and t2 may be varied depending upon the shape and size of the molded part, and the desired result. For a typical lens in a dual lens system, times dt within the range of from about 0 to about 5 or 10 seconds or more may be used. A dt of zero means that all areas in the molded part drop below the reference temperature at the same time. This may be theoretically an optimum mold, however due to the cooling characteristics of most molds, this may be difficult to achieve. So dt's of at least about 1 second, and sometimes at least about 5 seconds or more may be more easily accomplished and still achieve the objective of delaying hardening of the peripheral edge of the lens until after hardening of optical zone.

The performance of embodiments of the present inventions may not be strongly influenced by the shape of the temperature history curves to the left of t1. The present inventors contemplate that the center temperature Tc may be allowed to follow its normal decline over time to cross the Tg or other reference line at a t1. The mold of embodiments of the present inventions can be designed and programmed to delay t2 as has been discussed. The shape of the Tp curve to the left of t1 can through the addition of heat be caused to drop at a slower rate than Tc as illustrated. Alternatively, Tp can be allowed to drop at an unmodified rate for a given mold until it reaches a point just above the Tg such as Tg+1 or Tg+2 or greater. The peripheral edge temperature can then be held constant just above the Tg by the application of heat to the edge heating element, until the time that the edge heating element can be deactivated such that the t2 lags behind t1.

Figure 9A:
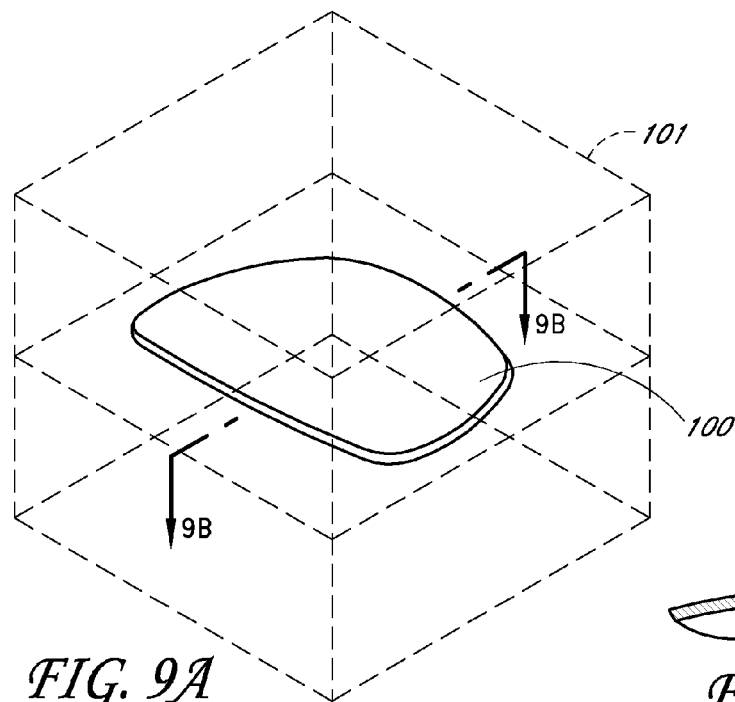
FIG. 9A is a perspective view of a lens made in accordance with an embodiment of the present inventions.
Figure 9B:
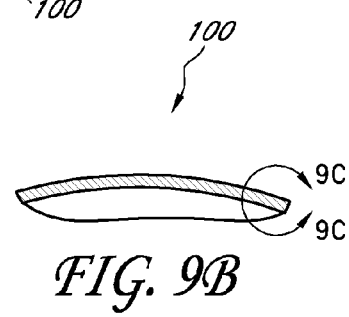
FIG. 9B is a side cross-sectional view of the lens of FIG. 9A taken along the lines 9B-9B of FIG. 9A.
Figure 9C:
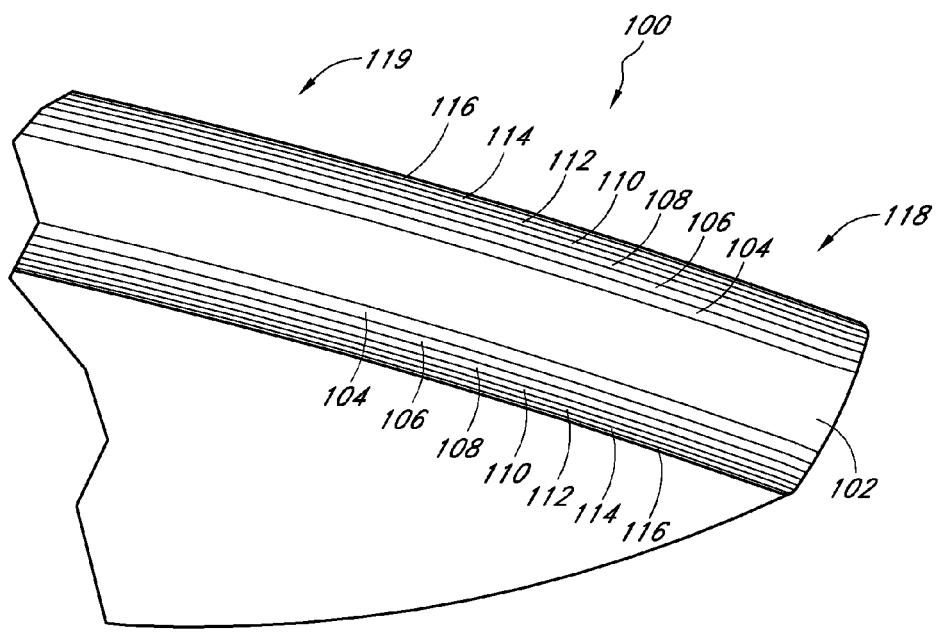
FIG. 9C illustrates a heat map of a portion of the lens of FIG. 9A taken along lines 9C-9C of FIG. 9B, representing general isothermal zones in the lens as the lens solidifies in a mold cavity immediately after resin has been injected into the mold cavity, in accordance with an embodiment of the present inventions.

Referring now to FIGS. 9A-C, FIG. 9A is a perspective view of a lens 100 being formed within a prior art injection molding apparatus 101. FIGS. 9A-C represent the lens 100 as it begins to cool immediately after resin has been injected into a mold cavity of the apparatus 101. FIG. 9B is a side cross-sectional view of the lens 100 of FIG. 9A taken along the lines 9B-9B. Upon cooling (see FIGS. 10-11C), the lens 100 will have been formed in a net-molded final shape and will not exhibit optical distortion along the perimeter of the lens 100 because the lens 100 has been manufactured in accordance with an embodiment of the present inventions.

FIG. 9C is a heat map of a portion of the lens 100 taken along lines 9C-9C of FIG. 9A. FIG. 9C represents a temperature distribution of the lens 100 as the lens 100 begins to solidify in a mold cavity immediately after resin has been injected into the mold cavity to form the lens 100, in accordance with an embodiment of the present inventions. In this regard, the heat map generally illustrates general constant temperature zones within the lens 100 during cooling of the lens 100. The generally constant temperature or generally isothermal zones are represented by element numbers 102-116. It is appreciated that the temperature in the zones is not equal or constant, and therefore, is not precisely isothermal; however, for simplicity, these zones are illustrated to show a general shift in temperature throughout the lens 100. The interior portion of the lens 100 will be at a higher temperature than the outer portions of the lens 100. Accordingly, in the map, isothermal zone 102 generally represents the highest temperature and isothermal zone 116 generally represents the lowest temperature.

For example, the isothermal zone 102 of the lens 100 represents an interior portion of the lens 100. Similarly, the isothermal zone 116 represents an exterior portion of the lens 100. Each of the isothermal zones 102, 104, and 106, generally represents the temperature distribution of an interior portion of the molded part. Isothermal zones 108-116 generally represent the temperature distribution of sections along an exterior of the molded part. The heat map of the FIG. 9C illustrates that during cooling the temperature of the lens 100 along its edges of 118 tends to drop evenly with the temperature of radially interior sections 119 of the lens 100. As such, this results in even lens thicknesses along the edges 118 and the radially interior sections 119.

In accordance with some embodiments, it is contemplated that isothermal zones 114 and 116 can be maintained at a temperature above the glass transition temperature. Further, as the temperature of the internal sections of the lens drops during cooling, the isothermal zones 102, 104, 106, 108, 110, and 112 can generally converge towards the temperature distribution represented by isothermal zones 114 and 116. Then, as the temperature of sections of the lens begins to drop below the glass transition temperature, the temperature along a perimeter or periphery of the optical disc or optical lens can be maintained generally at or above the glass transition temperature. In this manner, it is contemplated that the crystallization process can occur evenly throughout the lens, thus mitigating any optical distortion in the periphery of the lens.

Referring to FIGS. 10-11C, an eyeglass lens 120 is illustrated. The lens 120 is manufactured in accordance with the novel methods and apparatuses disclosed herein. As a result, the lens 120 tends not to exhibit optical distortion along a periphery 122 of the lens 120. In this regard, it should be noted that the reduction and/or elimination of the optical distortion in an optical article signifies that that portion of the optical article is as optically acceptable as other portions of the optical article so used.

Accordingly, as shown in FIG. 11C, by implementing embodiments of the present inventions, dimensional inaccuracy is generally eliminated in the periphery 122 of the lens 120. Unlike prior art apparatuses and products, the uniformity of resin crystallization is improved by holding the edge above the Tg (Glass Transition temperature) until about the same time as or later than when the center temperature drops below the Tg. Thus, a thickness 130 of the lens 120 is not increased along the periphery 122 due to premature crystallization of the resin along the edges of the lens 120. As such, in contrast to the lens 40 illustrated in FIG. 5C, lens 120 does not include an undesirable distortion zone.

In this regard, it is possible to achieve a net-molded lens or a net-molded optical disc that is substantially free of optical distortion due to an edge bead and does not require any cutting or finishing operations in order to be fully used.

Lenses molded in accordance with embodiments of the present inventions exhibit substantially the same physical geometry as the cavity from which they are molded, in their "as molded" condition (before post molding processing). Thus, the lens includes a front surface and a rear surface, having a constant or tapered thickness therebetween. Each of the front and rear surfaces normally conform to a portion of the surface of a three dimensional shape such as a sphere, toroid, cylinder or ellipse. In the example of a dual spherical lens, the front surface of the molded lens conforms to a portion of the surface of a sphere such that the front surface of the lens has a constant radius of curvature (or smooth progressive curve) throughout its arc length measured along a central horizontal meridian, and the front surface of the lens measured along a central vertical meridian conforms to a portion of a circle having the same radius. The curvature of the lens surface can remain substantially constant all the way to the edge of the lens, with either a de-minimus edge wave or no edge wave.

Similarly, the rear surface of the lens has a radius of curvature measured along a central horizontal meridian which is equal to the radius measured along a central vertical meridian and both have a constant radius throughout, without deviation from a peripheral edge wave. In lenses molded to exhibit a nonspherical geometry, each of the front and rear surfaces of the lens can conform substantially to the shape designed into the mold cavity, substantially free of edge deviation. The lens may be subject to additional processing steps after molding, such as to eliminate burrs or rough edges, but the optical portion of the lens extends substantially all the way to the edge of the as molded lens.

In order to achieve the foregoing objectives, there is provided an injection molding apparatus wherein the perimeter or peripheral areas of an optical disc or optical lens can maintain a specific temperature relationship relative to interior or central portions of the optical disc or optical lens. This relationship can be maintained through a pre-programmed algorithm preset or manually adjustable temperature controls, or through direct feedback based upon different areas in the mold cavity.

Figure 12:
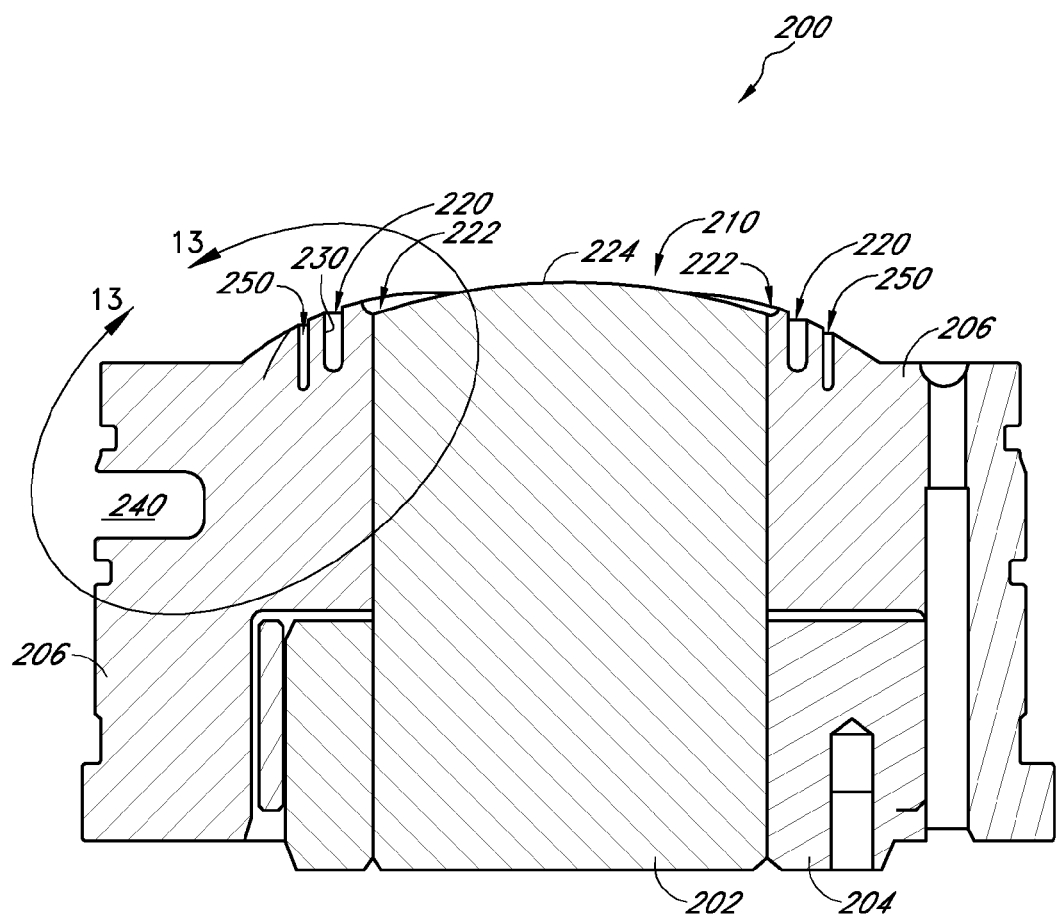
FIG. 12 is a cross-sectional side view of an injection molding apparatus, in accordance with an embodiment of the present inventions.
Figure 13:
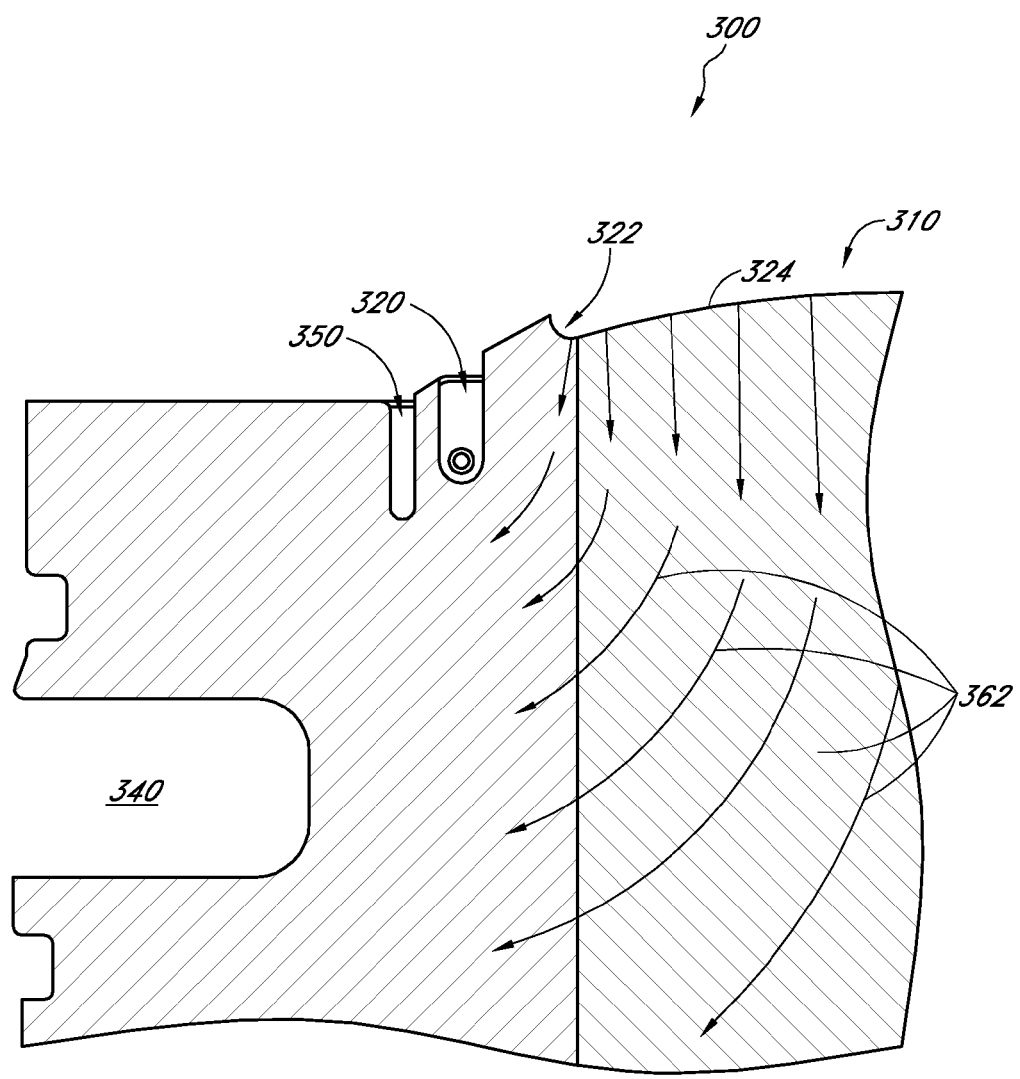
FIG. 13 is a cross-sectional side view of another injection molding apparatus, in accordance with another embodiment.

In accordance with an embodiment, FIG. 12 illustrates a lower section 200 of an injection molding apparatus. Although only the lower section 200 of the injection molding apparatus is shown in FIG. 12, a complementary upper section may be paired with the lower section 200 of the injection molding apparatus to form a complete injection molding die or apparatus. It is contemplated that in some embodiments, at least one section of the mold apparatus can incorporate features disclosed herein. In other embodiments, both sections of the mold apparatus can incorporate features disclosed herein. Further, it is contemplated that the principles and teachings disclosed herein may be equally applied in creating a mold die or apparatus having suitable dimensions and characteristics for optical discs or optical lenses. Furthermore, although FIGS. 12-13 illustrate mold apparatuses for use in creating optical lenses, the teachings and disclosure can be equally applied for mold apparatuses useful to create other optical articles.

In the illustrated embodiment, the lower section 200 of the injection molding apparatus can comprise an optical insert portion 202, a clamp portion 204, and an alignment plate portion 206. One of skill in the art will appreciate that in use, the lower section 200 can operate with the optical insert portion 202 being movable relative to the alignment plate portion 206 and the clamp portion 204. The optical insert portion 202 can be moved to a final position to thereby define a portion of a mold cavity 210. The mold cavity 210 is completely formed when the lower section 200 mates with an upper section of the injection molding apparatus to define an enclosed space. After the mold cavity 210 has been formed, a charge of resin can be injected into the mold cavity 210 and subsequently cooled to form a solid part. Thereafter, the upper section of the mold apparatus can be separated from the lower section 200 and the optical insert portion 202 can be used to eject the solidified part from the mold cavity 210.

In accordance with the embodiment illustrated in FIG. 12, the lower section 200 of the mold apparatus can comprise a temperature regulating element such as a heating element 220. The heating element 220 can be disposed around and/or adjacent to the peripheral edge of the mold cavity 210 in a configuration that allows the heating element 220 to regulate the temperature of the portion of the mold forming the periphery of the mold cavity 210. For example, the heating element 220 can be circumferentially disposed around and/or adjacent to the mold cavity 210.

It is contemplated that the temperature of the periphery of the mold cavity 210 can be maintained above the glass transition temperature of the resin as the center portions of the lens cool toward the glass transition temperature, as illustrated above in FIG. 8. In this regard, through the use of differential heating or cooling temperatures, the periphery of the lens or article can be maintained at a desired temperature relative to the temperature of the rest of the lens in order to reduce dimensional inaccuracies.

In some embodiments, the heating element 220 can be disposed in thermal communication with (e.g., adjacent) to an edge 222 of the mold cavity 210. The edge 222, as shown in FIG. 12, may comprise a rounded section of the mold cavity 210. However, in other embodiments, the edge 222 can comprise a squared-off boundary of the mold cavity 210. In accordance with an embodiment, the edge 222 can comprise that portion of the mold cavity 210 that is used to form the periphery of the lens. The heating element 220 is disposed such that it can maintain the edge 222 of the mold cavity 210 at a desired temperature during the injection molding process in order to facilitate differential cooling of the mold cavity 210.

For example, the heating element 220 can be disposed immediately adjacent to the edge 222 of the mold cavity 210, as shown in FIG. 12. The heating element 220 can be disposed at approximately the same elevation as (e.g., within the plane of) the mold cavity 210. The heating element 220 can also extend above and/or below the mold cavity 210 in the vertical direction. In some embodiments, the heating element 220 is spaced from the edge 222 of the mold cavity 210 by approximately between 3-4 mm. Further, the heating element 220 can extend from above a portion of the mold cavity 210 to below the mold cavity 210. For example, the heating element 220 can extend from above a lower surface 224 of the mold cavity 210 to approximately between 5-6 mm below the edge 222 of the mold cavity 210.

In some embodiments, the heating element 220 can extend circumferentially around and/or adjacent to the mold cavity 210. However, it is also contemplated that the heating element 220 can partially or non-continuously surround the mold cavity 210. It is contemplated that the heating element 220 can comprise one or more continuous or discrete members, cavities, channels and/or components that extend around and/or adjacent to or are spaced about the circumference of the mold cavity 210. For example, the heating element 220 can be discontinuously spaced or positioned about the mold cavity 210. The heating element 220 can therefore be variously shaped and configured, for example, as a thin element disposed adjacent a surface of the mold cavity 210, an embedded element or enclosed passageway, and/or an exposed channel wherein additional componentry can be permanently or removably placed.

In accordance with some embodiments, the heating element 220 can comprise a heat producing or heat transferring mechanism. As such, the heating element 220 can be used to provide additional heat to the mold apparatus. In accordance with a method of the present inventions, the heat provided by the heating element 220 can be selectively reduced (e.g., ramped down or stepped down) in order to provide a controlled differential cooling of the article. In this manner, the heating element 220 can be utilized to delay cooling of peripheral aspects of the molded part. Therefore, as discussed herein, an optical lens can be exposed to a cooling profile that reduces and/or eliminates optical distortion about the periphery of the lens.

The heat producing or heat transferring mechanism of the heating element 220 can be used to directly or indirectly control the amount of heat present about at least the periphery of the mold cavity 210. As noted above, the heat producing or heat transferring mechanism can be used to add or supply heat to the mold. However, the heat producing or heat transferring mechanism can also be used to control heat loss along peripheral portions of the mold cavity 210. The heat producing or heat transferring mechanism of the heating element 220 can comprise a circulating fluid, an electrical resistance-type heating element such as a wire or sheet, coil, or other component that can be used to transmit and/or regulate heating and cooling of the mold.

In accordance with some embodiments, the heating element 220 can comprise at least one channel 230. The heat producing or heat transferring mechanism of the heating element 220 can be disposed at least partially into the channel 230 in order to transmit and/or regulate heating and cooling of the mold. When incorporated into a new or existing mold of an optical disc, lens, or other optical part, the channel can therefore be designed and spaced relative to the mold cavity and other mold components such as the runner(s), gate(s), and/or vent(s) of the mold in order to achieve a desirable cooling profile, such as that discussed herein.

For example, in certain conventional lens molds, the channel 230 cannot fully encircle the lens or mold cavity 210 due to the side location of the gate for injection. The channel 230 may encircle at least about 50% of the perimeter or edge 222 of the mold cavity 210 of a lens mold in some embodiments. However, in other embodiments the channel 230 can encircle at least about 75% of the perimeter or edge 222 of the mold cavity 210 of a lens mold. Further, in yet other embodiments, the channel 230 can encircle as much as about 80% or about 90% or more of the perimeter or edge 222 of the mold cavity 230 of a lens mold.

However, in certain molds for optical discs, the gate for injection may be in a different location in mold. For example, in molds used to manufacture CD's or DVD'S, the gate is central to the injection-molded part and is later punched free of the finished part. Therefore, in such an embodiment, the channel 230 can fully encircle the perimeter or edge 222 of the mold cavity 210. Accordingly, in some embodiments, the channel 230 can be configured depending on the location of the runner(s), gate(s), and/or vents(s) of the mold.

Therefore, embodiments can be configured such that the channel 230 can extend continuously around and/or adjacent to the entire perimeter or edge 222 of the mold cavity 210. Alternatively, the channel 230 can also extend discontinuously around the perimeter or edge 222 of the mold cavity 210. The channel 230 can extend continuously or discontinuously around at least 50% of the perimeter or edge 222 of the mold cavity 210. Additionally, the channel 230 can extend continuously or discontinuously around at least 75% of the perimeter or edge 222 of the mold cavity 210. Finally, the channel 230 can extend continuously or discontinuously around the entire perimeter or edge 222 of the mold cavity 210.

In embodiments wherein the heating element 220 extends continuously around and/or adjacent to the mold cavity 210, the channel 230 can be formed in a continuous loop in order to generally encircle the mold cavity 210. The channel 230 can be optimized to insulate the edge 222 of the cavity 210 from heat loss by conduction to adjacent portions of the mold, thereby delaying the time that the peripheral edge 222 cools to the transition temperature.

Further, the channel 230 can receive the heat producing or heat transferring mechanism of the heating element 220 in order to achieve the desired cooling of the periphery or edge 222 of the mold cavity 210. For example, if the channel 230 is formed as a groove in the mold, an open face of the groove can be covered to enclose a flow path for receiving a circulated fluid, or a tube can be positioned within the groove for receiving a heating media. As noted above, other embodiments can utilize a heat producing or heat transferring mechanism such as an electrical resistance-type material, cable, coil, or wire which can be placed within the channel 230. See FIG. 13.

In embodiments wherein the heating element 220 extends discontinuously around and/or adjacent to the mold cavity 210, the channel 230 can comprise one or more cavities or grooves that are formed in the mold. These cavities or grooves can be spaced about the periphery of the mold cavity 210 in a desired pattern in order to facilitate optimal differential cooling of the mold cavity 210. It is contemplated that these cavities or grooves can be used to receive a fluid or an electrical resistance-type cable, coil, or wire, as similarly described above. For example, the heating element 220 can comprise a plurality of individual coils spaced about the circumference of the mold cavity 210 or a multi-channel fluid system.

Any of a variety of heating or thermal regulation structures disclosed herein can be incorporated into existing molds, thereby allowing existing molds to be improved by implementing principles of the present inventions. Accordingly, the cost of a purchasing new mold can be avoided by modifying an existing mold using methods disclosed herein. This is yet another advantage of embodiments of the present inventions by which a company can easily and cost-effectively upgrade its molds and thereby produce a higher quality product.

For example, embodiments disclosed herein can be incorporated into existing molds by milling a channel(s) into a mold using a CNC mill or other machining equipment by a skilled machinist. Thereafter, one or more heating elements can be disposed into the cavity or channel to facilitate controlling the cooling profile of the mold cavity. Alternatively, as discussed above, the channel can be formed such that it can be enclosed in order to allow circulation of a heat exchange fluid therethrough. Because such alterations to the mold die would be external to the mold cavity, any fine tolerances of the mold cavity need not be disturbed while retrofitting an existing mold.

Thus, there is provided in accordance with embodiments of the present inventions a method of modifying an existing mold to allow the mold to maintain the peripheral temperatures above a predetermined temperature such as the glass transition temperature until a central portion of the mold cools to below the glass transition temperature. The method comprises the steps of providing a mold, having at least a first and a second component which complement each other to define a mold cavity. The cavity includes a central portion, such as for forming the optical portion of a lens, and a peripheral portion, for forming the edge of the lens. The method comprises the steps of installing a heat source in thermal communication with the peripheral edge, such as by mounting the heat source to one or both of the mold components. The heat source is mounted such that heat conducted from the heat source reaches the peripheral edge, before reaching the optical portions of the mold. The heat source may be an electrical resistance element, a tubular passageway for receiving a circulating thermal exchange media, or others as has been discussed.

Embodiments can therefore additionally provide a mold which has been modified to accomplish the cooling profile described herein. The mold includes a peripheral heat source coupled in thermal communication with the peripheral edge of the mold cavity. A controller is provided for regulating the heat source, such as by maintaining the peripheral edge of the mold at a predetermined minimum temperature such as at or above the glass transition temperature until a central portion of the mold drops below the predetermined temperature.

FIG. 12 also illustrates that the lower section 200 of the injection molding apparatus can comprise a cooling element 240. The cooling element 240 can extend through the lower section 200 and be used to assist in withdrawing heat from the injection mold apparatus. In some embodiments, the cooling element 240 can be generally shaped as a channel. For example, the cooling element 240 can be shaped as a generally rectangular-shaped channel that extends through the alignment plate portion 206 of the lower section 200.

As discussed above with respect to the channel 230, the cooling element 240 can also be formed to continuously or discontinuously extend through the mold. For example, the cooling element 240 can extend circumferentially around and/or adjacent to the mold cavity 210. The cooling element 240 can comprise one or more continuous and/or discrete members, cavity, apertures, and/or components. The cooling element 240 can also utilize fluid flow or electrical means in order to facilitate the transfer of heat from the mold.

The configuration and orientation of the cooling element 240 can be varied relative to the configuration and orientation of the heating element 220. The embodiments illustrated in FIGS. 12 and 13 provide examples of how the configuration and orientation of the cooling element 240 can be selectively modified. The mold illustrated in FIG. 12 is configured such that the cooling element 240 is spaced at a greater circumferential distance than the cooling element 340 illustrated in FIG. 13. Further, the cooling element 340 illustrated in FIG. 13 provides a greater cross-sectional area then the cooling element 240 illustrated in FIG. 12; in such an embodiment, the volume of fluid flow can be greater.

Further, as discussed in greater detail below, the configuration and orientation of the cooling element 240 relative to the heating element 220 can influence the cooling profile of the molded article. Accordingly, the cooling element 240 should be configured to provide sufficient heat capacitance in relation to the amount of heat provided by the plasticized resin. The cooling element 240 can also be configured to provide sufficient heat capacitance in relation to the heating element 220.

Referring again to FIGS. 12 and 13, the lower section 200 of the mold can be configured to include one or more insulating elements 250. The insulating element 250 can be used to impede and/or restrict heat flow through selected portions of the mold. In other words, the insulating element 250 can provide a different amount of thermal conductivity than surrounding areas of the mold in order to influence heat flow throughout the mold. In this regard, the selective placement and configuration of the insulating element 250 can advantageously restrict heat flow throughout the mold in order to facilitate differential cooling of the molded part. Further, the insulating element 250 can also be selectively positioned throughout other sections of the mold as desired.

For example, the insulating element 250 can be configured such that the heating element 220 is positioned intermediate the insulating element 250 and the mold cavity 210. Further, it is also contemplated that the insulating element 250 can be disposed intermediate the cooling element 240 and the heating element 220.

As illustrated in FIGS. 12 and 13, the insulating element 250 is positioned adjacent to the heating element 220. In such embodiments, the insulating element 250 can tend to restrict the flow of heat from the heating element 220 in a direct path towards the cooling element 240. Instead, any heat provided by the heating element 220 can be conducted through the mold generally in the direction of the periphery or edge 222 of the mold cavity 210. However, as illustrated in FIG. 13 and has discussed further below, any heat provided by the heating element 220 is differentially offset by the amount of heat conducted away from the mold cavity toward the cooling element 240 and/or other portions of the mold apparatus.

In some embodiments, the insulating element 250 can comprise at least one continuous and/or discontinuous member, cavity, aperture, and/or component. For example, the insulating element 250 may include a clear-through channel that extends at least partially adjacent portions of the heating element 220. In some embodiments, both the heating element 220 and the insulating element 250 can be configured as circumferential channels that are concentrically spaced relative to each other. As illustrated in FIGS. 12 and 13, the insulating element 250 can extend adjacent to and vertically lower than the heating element 220 in the mold apparatus. The insulating element 250 can also comprise one or more materials exhibiting physical properties that are distinct from physical properties of the mold.

In the illustrated embodiments of FIGS. 12 and 13, the insulating element 250 is disposed adjacent to the heating element 220. In this manner, heat flow away from the edge 222 of the mold cavity 210 can be at least partially regulated by the insulating element 250. In such an embodiment, the use of the insulating element 250 can be beneficial to not only regulate heat flow throughout mold, but can thereby also make the use of the heating element 220 more efficient. The effect and interaction of the insulating element 250 can generally be seen in relation to the heating element 220 and the cooling element 240 through the heat flow lines shown in FIG. 13, which is also discussed in greater detail below.

FIG. 13 an enlarged, partial cross-sectional view of a lower section 300 of an injection molding apparatus, which is similar to the lower section 200 illustrated in FIG. 12. The lower section 300 includes a mold cavity 310 having an edge 322 and a lower surface 324, a heating element 320, a cooling element 340, and an insulating element 350.

FIG. 13 provides a graphic illustration of heat flow lines in order to show the interaction between the heating element 320, the cooling element 340, and the insulating element 350. It is contemplated that the illustration found in FIG. 13 can be equally applied to the lower section 200 illustrated in FIG. 12, as well as to other embodiments discussed herein. The heat flow lines illustrated in FIG. 13 indicate that differential cooling can take place along the edge 322 of the mold cavity 310 relative to other portions of the mold cavity 310. The illustration of the heat flow lines provides a visual explanation of many of the principles discussed herein regarding heat flow and differential cooling of the mold cavity.

In some embodiments, heat provided by the heating element 320 may be dissipated in a diminishing capacity towards other portions of the mold cavity 310. However, the effect of the cooling element 330 is such that heat is drawn from certain central portions of the mold cavity 310. In this manner, the temperature of the edges 322 of the mold cavity 310 can be selectively controlled in order to reduce and/or eliminate any dimensional inaccuracies of the lens product.

In the embodiment of the lower section 300 illustrated in FIG. 13, the effect of the heating element 320 as well as the cooling element 340 can be presumed as symmetrical relative to the mold cavity 310. In other words, in such an embodiment, it is contemplated that the heating element 320 and the cooling element 340 can extend around and/or adjacent to the entire circumference of the mold cavity 310. Thus, according to the illustrated embodiment, cooling and heat transfer can take place generally symmetrically throughout the mold apparatus. Such a model is applicable for optical discs used for data storage as well as a various sizes and configurations of optical lenses.

Accordingly, the position of the heating element 320 relative to the cooling element 340 can create a dynamic heat flow system in which the mold cavity 310 is differentially cooled.

For example, immediately around the heating element 320, the temperatures can tend to be at their highest and that these temperatures can be concentrated along the edge 322 of the mold cavity 310. However, departing from the edge 322 of the mold cavity 310, the temperatures can decrease along the mold cavity 310. As such, the highest temperatures along the lower surface 324 of the mold cavity 310 may be present along the edge 322 of the mold cavity 310. Thus, as illustrated by heat flow lines 362, a greater amount of the heat can be transferred or conducted through the mold apparatus in centralized areas of the mold cavity 310.

In other words, heat can be transferred from the resin through the mold cavity 310 and conducted through the lower section 300 of the injection molding apparatus at a higher rate in the center of the mold cavity 310. Departing however, from the center of the mold cavity 310, the heat transfer rate from the resin can decrease approaching the edge 322. In some embodiments, the heat transfer rate at one or more locations along the lower surface 324 of the mold cavity 310 can exhibit a linear relationship, such as a linear decrease; however, the relationship can be other than linear and can vary over time. Further, in other embodiments, the heat transfer rate can be maintained even along all locations of the edge 322 and a lower surface 324 of the mold cavity 310, or vary over time. Indeed, it is contemplated that whether controlled by a human or by computer feedback, the rate of heat transfer in selected areas along the lower surface 324 of the mold cavity 310 can vary as the article cools.

Further, it is contemplated that although the embodiment illustrated in FIG. 13 illustrates the use of a cooling element 340, the cooling element 340 is not critical nor required in order for embodiments of the present inventions to be effective in reducing optical distortion along the periphery of optical articles. Indeed, the cooling element 340 tends to facilitate faster cooling of the mold and therefore, of the molded article, which enhances the efficiency and speed of the injection molding process.

However, the use of a cooling element 340 can also tend to create a larger temperature gradient along the mold cavity 310. Accordingly, the configuration and position of the cooling element 340 relative to the heating element 320 can be selectively modified in order to produce a desired temperature pattern or gradient along the lower surface 324 of the mold cavity 310.

Thus, embodiments of the present inventions provide for an injection molding apparatus that can utilize a non-steady state or differential thermal conduction in order to allow an injection molded part at a desired rate in selected portions thereof. Accordingly, in embodiments wherein an optical lens is formed, the differential thermal conduction of the injection molding apparatus can reduce optical distortion along the periphery of the lens. In particular, by insuring that the resin disposed at the peripheral portions of the lens cools and crystallizes at the same time as or subsequent to resin disposed in the center of the lens, irregularities in the thickness of the lens can be reduced and/or eliminated.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A net-molded optical article comprising:
a front surface conforming substantially to a first predetermined geometry;
a rear surface conforming substantially to a second predetermined geometry; and
a body in between the front and rear surfaces, the body having a first thickness between the front and rear surfaces adjacent a periphery of the body, the body further having a second thickness at the periphery of the body, the second thickness being equal to or less than the first thickness of the body adjacent to the periphery;
wherein the periphery of the article does not comprise an edge bead in the as-molded configuration such that optical distortion of the article is reduced or eliminated adjacent the periphery and at the periphery thereof;
wherein the optical article is a plano eyeglass lens.

2. The optical article of claim 1, wherein the thickness of the body tapers between at least a portion of the front surface and the rear surface.

3. The optical article of claim 1, wherein the body defines a substantially constant thickness or uniform surface curvature substantially all of the way to an edge of the optical article.

4. The optical article of claim 1, wherein the lens comprises a spherical geometry.

* * * * *